United States Patent [19]

Hiraiwa et al.

[11] 4,151,902
[45] May 1, 1979

[54] PARKING BRAKE MECHANISM FOR MOTOR VEHICLE EQUIPPED WITH POWER TRANSMISSION WITH TORQUE CONVERTER

[75] Inventors: Kazuyoshi Hiraiwa, Ome; Kotei Takahashi, Tokyo, both of Japan

[73] Assignee: Nissan Motor Company, Limited, Yokohama, Japan

[21] Appl. No.: 819,166

[22] Filed: Jul. 26, 1977

[30] Foreign Application Priority Data

Jul. 27, 1976 [JP] Japan .................................. 51/89474

[51] Int. Cl.² .............................................. B60T 1/06
[52] U.S. Cl. ..................................... 192/4 A; 188/31
[58] Field of Search ................... 192/4 A; 188/31, 60, 188/69; 74/411.5

[56] References Cited

U.S. PATENT DOCUMENTS

| 2,875,856 | 3/1959 | Mrlik et al. ........................... 192/4 A |
| 4,031,977 | 6/1977 | Grosseau .......................... 192/4 A X |

FOREIGN PATENT DOCUMENTS 2060883  7/1971  Fed. Rep. of Germany .......... 192/4 A

*Primary Examiner*—Benjamin W. Wyche
*Attorney, Agent, or Firm*—Schwartz, Jeffery, Schwaab, Mack, Blumenthal & Koch

[57] ABSTRACT

A brake pawl having a tooth engageable with brake gear means is mounted so as to be biased in a direction to disengage the tooth from the brake gear means. The brake pawl is formed at a side thereof opposite to another side facing the brake gear means with a first cam portion. A spring-loaded parking cam having at a portion engageable with the first cam portion a second cam portion is slidably mounted on a fork shaft which is parallel with the output shaft of the transmission. The axial movements of the fork shaft due to the movements of a manually operated shift lever cause the engagement and disengagement of the second cam portion with and from the first cam portion to accomplish locking and unlocking of the output shaft.

10 Claims, 7 Drawing Figures

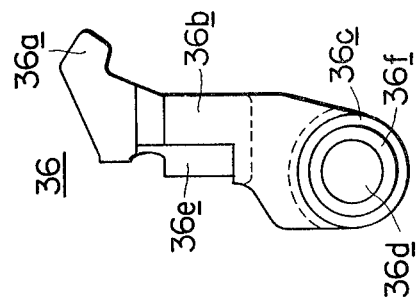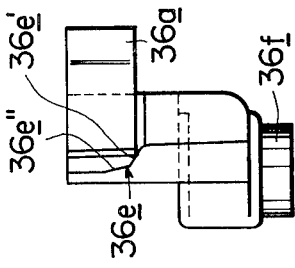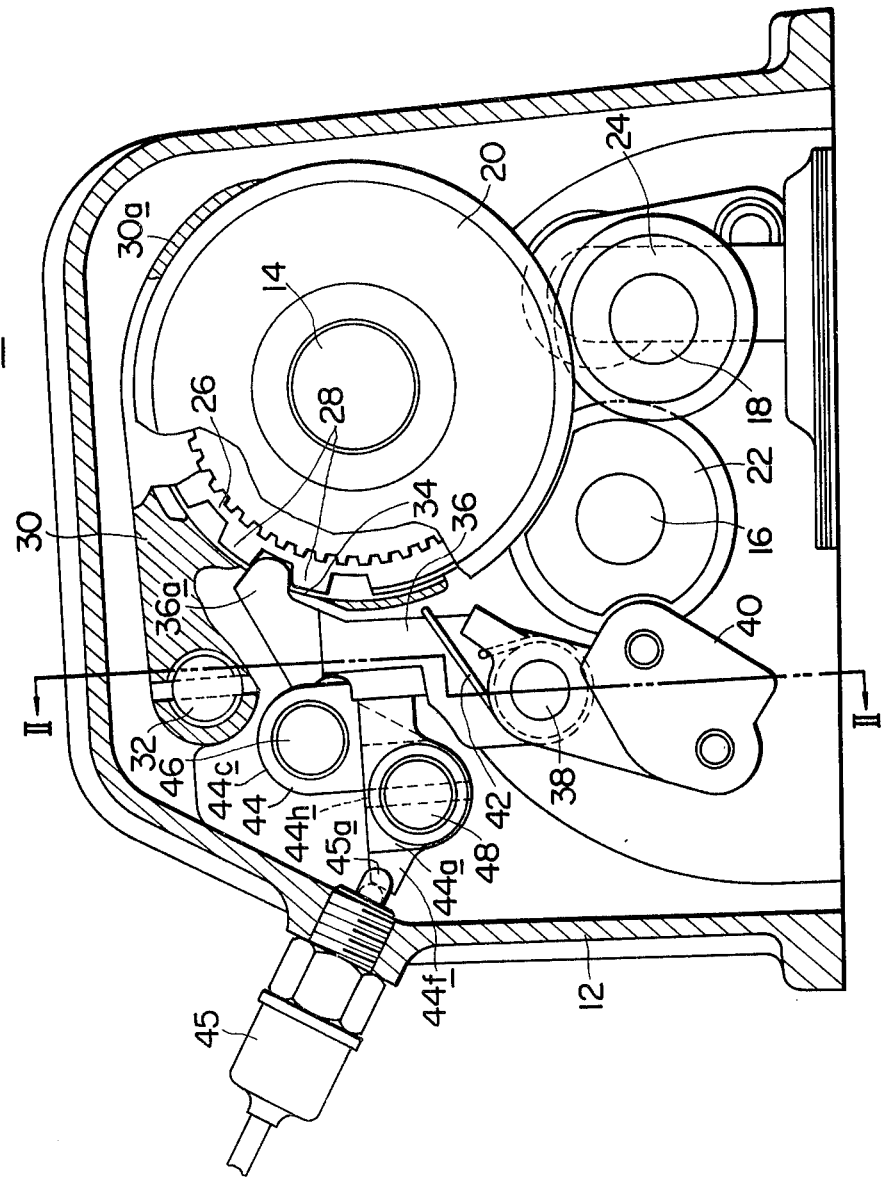

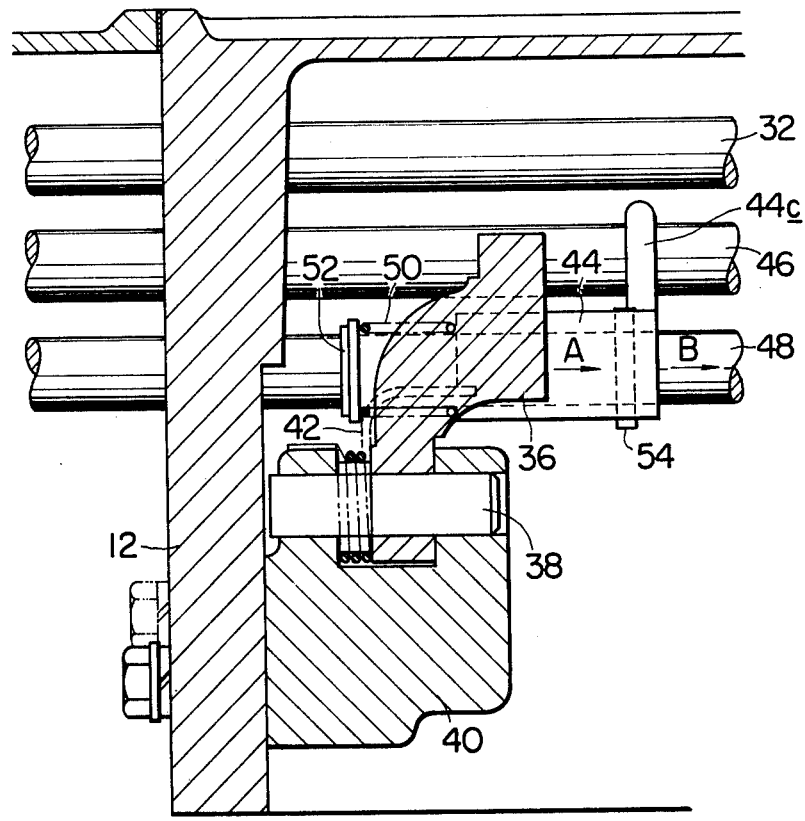
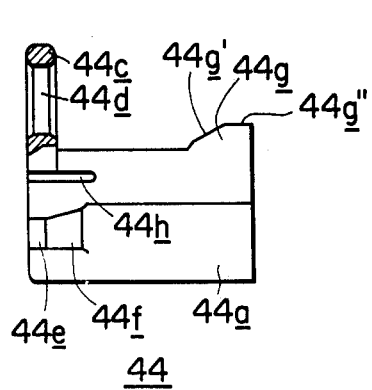
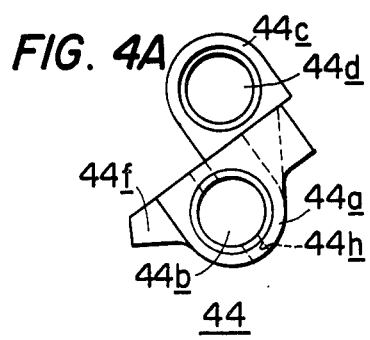
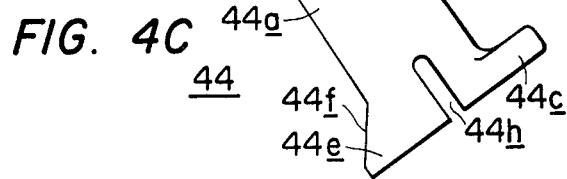

PARKING BRAKE MECHANISM FOR MOTOR VEHICLE EQUIPPED WITH POWER TRANSMISSION WITH TORQUE CONVERTER

FIELD OF THE INVENTION

The present invention relates in general to brakes, and more particularly to a parking brake mechanism for use with an automative power transmission which is connected to the automative engine through a torque converter.

BACKGROUND OF THE INVENTION

In a motor vehicle having a power transmission powered by an automotive engine through fluid couplings or a torque converter, it is common to equip the vehicle with a parking brake mechanism which is capable of anchoring the output shaft of the power transmission when secure parking of the vehicle is required. However, conventional parking brake mechanisms of the type mentioned above have a bulky construction due to their complicated constructions requiring relatively big mounting spaces in the transmission. This means that the entire construction of the transmission becomes large.

SUMMARY OF THE INVENTION

Therefore, it is an object of the present invention to provide a novel and improved parking brake mechanism which is constructed compact in size thereby requiring a minimum amount of space for accomodation in a transmission housing.

It is another object of the present invention to provide an improved brake mechanism in which the release action thereof allowing free rotation of the transmission output shaft is readily made without requiring a large operational force.

It is still another object of the present invention to provide an improved parking brake mechanism which can maintain its braking operation against the transmission output shaft even when the output shaft is urged to rotate severely because of standing of a vehicle equipped with the mechanism on a steep slope.

According to the present invention, there is provided a parking brake mechanism for a motor vehicle transmission having a transmission output shaft and a transmission fork shaft which is movable parallelly with respect to the output shaft in response to the movement of a manually operated shift lever, the mechanism comprising brake gear means coaxially mounted on the output shaft for rotation therewith; a brake pawl mounted for rotation about an axis parallel with the output shaft and carrying a tooth engageable with the brake gear means, the brake pawl being formed at a side thereof opposite to another side thereof facing the brake gear means with a first cam portion; first biasing means for biasing the brake pawl in a direction to disengage to tooth from the brake gear means; a parking cam axially slidably carried by the fork shaft by passing the fork shaft through a passage formed in the parking cam, the parking cam being formed at a side thereof facing the first cam portion of the brake pawl with a second cam portion; and second biasing means for the parking cam along the axis of the fork shaft in a direction to engage the second cam portion with the first cam portion for urging the brake pawl in a direction to engage with the brake gear means against the force of the first biasing means.

BRIEF DESCRIPTION OF THE DRAWINGS

Other objects and advantages of the present invention will become more apparent from the following detailed description when taken in conjunction with the accompanying drawings, in which:

FIG. 1 is a partial cross section view of a motor vehicle power transmission equipped with an improved parking brake mechanism according to the present invention;

FIG. 2 is a view taken along the line II—II shown in FIG. 1;

FIGS. 3A and 3B are respective side and plan views of a brake pawl employed as a part of the parking brake mechanism of the invention; and FIGS. 4A, 4B and 4C are respective side, plan and back views of a parking cam also employed in the mechanism of the invention.

DESCRIPTION OF THE PREFERRED EMBODIMENT

Referring to FIG. 1 of the drawings, there is illustrated a power transmission which is generally designated by a reference numeral 10 and includes therein an improved parking brake mechanism according to the invention. Although not shown, the transmission 10 is connected to an automative engine through a torque converter.

The transmission 10 generally comprises a transmission housing 12 in which an output shaft 14, a countershaft 16 and a reverse idler shaft 18 are parallelly mounted. Output shaft gears 20, countershaft gears 22 and reverse idler gears 24 are operatively and respectively mounted around the output shaft 14, the countershaft 16 and the reverse idler shaft 18 in a convential manner. In the drawing, however, only one gear in each group is illustrated. In the illustrated embodiment, the engine power from the torque converter is transmitted through the counter gear 22 to the reverse idler gear 24 and to the output shaft gear 20. By shifting a coupling sleeve 26 along the axis of the output shaft 14 in one direction, synchronization in rotational speed between the output shaft gear 20 and a hub (not shown) fixed to the output shaft 14 is completed thus transmitting the power of the output shaft gear 20 to the output shaft 14.

In accordance with the present invention, the coupling sleeve 26 is formed around its periphery with external teeth 28. As will be apparent herein after, the coupling sleeve 26 acts as a parking gear. The coupling sleeve 26 is moved to and fro on the output shaft 14 by means of a shifting fork 30 which is fixed to a first fork shaft 32 and has a branched off fork portion 30a covering half of the toothed periphery of the coupling sleeve 26 so that the axial movements of the first fork shaft 32 induce to and fro movements of the coupling sleeve 26. Although not well shown in the drawing, the fork portion 30a is formed relatively wide. An opening 34 is formed in the fork portion 30a at a portion just facing the toothed periphery of the coupling sleeve 26.

A brake pawl 36 is mounted on a support shaft 38 for oscillation and out of engagement of a tooth 36a thereof with a gap between adjacent two teeth 28 on the coupling sleeve 26. This oscillation is carried out by passing the tooth 36a through the opening 34. The support shaft 38 is rotatably supported by a bracket 40 which has two aligned through holes (no numerals) through which the support shaft 38 is passed as well shown in FIG. 2. The bracket 40 is firmly connected to the housing 12 by suitable means such as bolts and nuts. The brake pawl 36 is biased by a return spring 42 in a direction to disengage the tooth 36a from the gap between adjacent two teeth 28. Thus, as will be clearly described, the locking engagement between the tooth 36a and the gap is achieved only when the brake pawl 36 is urged toward the gap against the force of the return spring 42 due to a characteristic sliding engagement of the brake pawl 36 with a later-mentioned parking cam 44.

As is well shown in FIGS. 3A and 3B, the brake pawl 36 is formed with a shank portion 36b between the tooth 36a and a hub portion 36c having a through hole 36d through which the above-mentioned support shaft 38 is passed. Further, the shank portion 36b is formed at its outer side opposite to the tooth 36a with a cam surface 36e which is adapted to engage with another cam surface 44g formed on the parking cam 44. Indicated by numeral 36f is a small diameter portion of the hub portion 36c around which multiple turns of the return spring 42 are disposed as best seen in FIG. 2. As shown in FIG. 3B, the cam surface 36e of the brake pawl 36 includes first and second inclined sections which are respectively designated by reference numerals 36e' and 36e". Now, it should be noted that the inclination angle of the first inclined section 36e' with respect to the axis of the through hole 36d of the brake pawl 36 is considerably greater than that of the second inclined section 36e" for reasons which will be described hereinafter.

Referring to FIG. 2, the parking cam 44 is arranged to slide axially along second and third parallel fork shafts 46 and 48 which are axially slidably disposed in the casing 12 and are parallel with the before-mentioned first fork shaft 32. These fork shafts 46 and 48 as well as the shaft 32 carry thereon their corresponding shifting forks (not shown) and are axially movable in response to shifting movements of a driver operable transmission shift lever (not shown). In this embodiment, the third fork shaft 48 is a reverse shaft which carries a fork for a reverse output gear (not shown). As best seen in FIGS. 4A to 4C, the parking cam 44 includes a body portion 44a through which a passage 44b for the third fork shaft 48 if formed. Projecting upwardly from one axial end of the body portion 44a is a ring portion 44c in which an opening 44d is formed. A projection 44e is integrally provided on axial side of the body portion 44a to form an inclined surface 44f at its side, the projection 44e extending substantially perpendicularly to the axis of the passage 44b. This projection 44e accomodates a rear light switch 45 (see FIG. 1) to light a rear light (not shown) when pushing a button 45a of the switch 45 by its inclined surface 44f. Projecting from the other axial side of the body portion 44a toward opposite direction to the projection 44e is a cam surface 44g which is slidably engageable with the before-mentioned cam surface 36e of the brake pawl 36. As best seen in FIGS. 4B and 4C, the cam surface 44g, similar to the cam surface 36e of the brake pawl 36, includes first and second inclined sections 44g' and 44g". It should be noted that the inclination angle of the first inclined section 44g' with respect to the axis of the passage 44b is considerably greater than that of the second inclined section 44g" for reasons which will be explained later. Indicated by a reference numeral 44h is a cut or slit which is arranged to extend to the one axial side of the body portion 44a along the axis of the passage 44b to traverse the diameter of the same.

Referring again to Fig. 2, the parking cam 44 is shown to be supported by the second and third fork shafts 46 and 48 by allowing the shafts to respectively pass through the opening 44d of the ring portion 44c and the passage 44b of the body portion 44a. In this instance, the arrangement between the parking cam 44 and the brake pawl 36 is such that the first inclined section 44g' of the parking cam 44 faces the first inclined section 36e' of the brake pawl 36 under a condition wherein the tooth 36a of the brake pawl 36 is disengaged from the gap of the teeth 28 of the coupling sleeve 26. The ring portion 44c is for preventing the parking cam 44 from rotation thereof about the third fork shaft 48 and for achieving smooth axial movement of the body portion 44a of the parking cam 44 along the shaft 48. For urging the parking cam 44 rightwardly, as viewed along arrow A shown in the drawing, a spring 50 is disposed between the axial other end of the parking cam 44 and a spring seat 52 fixed to the third fork shaft 48. Indicated by numeral 54 is a stop pin which is fixedly disposed in a diametrically extending through hole (no numeral) formed in the third fork shaft 48 to cooperate with the cut 44h of the parking cam 44 for limiting the axial rightward movement of the parking cam 44 by the force of the spring 50. Under inoperative or neutral position of the third fork shaft 48, the cam surface 44g of the parking cam 44 is axially separated from the cam surface 36e of the brake pawl 36 not to rotate the brake pawl 36 toward the teeth 28 formed on the coupling sleeve 26. However, as will be described next, the axial rightward movement of the third fork shaft 48 from its rest position induces the rotation of the brake pawl 36 toward the teeth 28 in a direction to engage the tooth 36a with the teeth 28 or the gap between adjacent two teeth.

With the above-described construction of the parking brake mechanism of the present invention, the operation thereof is as follows:

While the transmission shift lever (not shown) is positioned at either the driving positions or the neutral position, the third fork shaft 48 stays in its rest or neutral position wherein the cam surface 44g of the parking cam 44 is disengaged from that of the brake pawl 36. Thus, the tooth 36a of the brake pawl 36 is kept separated from the teeth 28 on the coupling sleeve 26 thus permitting free rotation of the output shaft 14 of the transmission 10.

Under a standstill or the like of the vehicle, when the shift lever (not known) of the transmission is moved by the driver to a parking position, the first fork shaft 32 is moved (or stays) to allow the coupling sleeve 26 to stay in a neutral position wherein the coupling sleeve 26 engages with only the hub (not shown) fixed to the output shaft 14, and simultaneously the third fork shaft 48 is moved rightwardly, as shown by arrow B in Fig. 2. By this movement of the shaft 48, the parking cam 44 is instantly brought into contact at its first inclined section 44g' with the first inclined section 36e' of the brake pawl 36 and thus, if the tooth 36 a of the brake pawl 36 is in alignment with the gap between the corresponding adjacent two teeth 28 of the coupling sleeve 26, the first inclined section 44g ' of the parking cam 44 rides up the first inclined section 36e ' of the brake pawl 36 and then the second inclined section 44g rides up the second inclined section 36e thereby urging the brake pawl 36, more specifically the tooth 36a into engagement with the gap of the teeth 28 against the force of the return spring 42. By this. the output shaft 14 is completely locked in place achieving parking brake of the vehicle.

If the tooth 36a is misaligned from the gap of the teeth 28, the riding up operation of the first inclined section 44g' on the first inclined section 36e' is stopped just when the tooth 36a contacts the peripheral outer surface of the corresponding one of the teeth 28. In this state, however, the parking cam 44 is applied with an increased biasing force by the spring 50, thus, the brake pawl 36 is biased to rotate toward the teeth 28. Thus, as soon as the tooth 36a of the brake pawl 36 and the gap of the teeth 28 come into alignment upon slight rotation of the coupling sleeve 26, the cam surface 44g of the parking cam 44 completely rides upon the cam surface 36e" of the brake pawl 36 with a result that the tooth 36a of the brake pawl 36 is brought into engagement with the gap of the teeth 28 thereby locking the coupling sleeve 26 and thus the output shaft 14. Upon complete engagement of the tooth 36a of the brake pawl 36 with the gap, further axial movement of the parking cam 44 is securely stopped by the stop pin 54 which then contacts a bottom of the cut 44h of the parking cam 44.

When release of the parking brake is required, the shift lever of the transmission is shifted back by the driver to the neutral position. By this action, the third fork shaft 48 is moved leftwardly in Fig. 2, from the previously set parking position while moving the parking cam 44 leftwardly by the fixed stop pin 54, so that the cam surface 44g of the parking cam 44 is disengaged from the cam surface 36e of the brake pawl 36. Thus, the brake pawl 36 returns to its original inoperative position by the force of the return spring 42 disengaging the tooth 36a thereof from the gap of the teeth 28 on the coupling sleeve 26. Accordingly, free rotation of the output shaft 14 is permitted. It should be noted that, because of provision of the second inclined section with a small inclination on each cam surface 44g and 36e, the initial release action of the parking cam 44 from the brake pawl 36 in operating condition is easily made without requiring big force. The reason of this advantageous fact will be described next.

In a parking condition wherein the second inclined section 44g" of the parking cam 44 is engaged with the second inclined section 36e" of the braking pawl 36, slight rotation of the coupling sleeve 26 will cause a force which tends to separate the tooth 36a of the brake pawl 36 from the gap of the teeth 28 of the sleeve 26, the magnitude of the separation force being increased by a force exerted by the return spring 42. Thus, in such a condition, if the frictional resistance generated between the contacting surfaces of both cam surfaces 44g and 36e is arranged to be slightly greater than the increased separation force, the release action for separating or disengaging the cam surfaces 44g and 36e from each other requires only a small force. In fact, the force actually used for unlocking the output shaft 14 is the difference between the frictional resistance and the separation force. It should be noted that in the invention, the gently sloped second inclined sections 44g" and 36e" obtain the above-mentioned sufficient frictional force between the cam surfaces 44g and 36e, and the steeply sloped first inclined sections 44g' and 36e' achieve quick locking motion of the brake pawl 36 with a short axial movement of the parking cam 44.

Furthermore, in this invention, the urging force of the spring 50 in working state is determined considerably greater than the frictional resistance between the second inclined sections 44g" and 36e" for achieving secure contact between same. This means that the locking engagement of the tooth 36a of the brake pawl 36 against the coupling sleeve 26 becomes complete.

It will now be appreciated from the proceeding description that since the second and third fork shafts 46 and 48 for shifting their corresponding shift forks are used for supporting or moving the parking cam 44, and the movement of the parking cam 44 causing locking or unlocking of the output shaft 14 is not parallel with but perpendicular to the rotational movement of the brake pawl 36, the brake mechanism of the invention can be made considerably compact and simple in construction.

It will also be noted that, because of provision of the second inclined sections 44g" and 36e" with gentle slopes, the release of the brake pawl 36 from the corresponding gap of the teeth 28 is made without requiring big force.

It should be also noted that the leftward movement of the third fork shaft 48 from its rest or neutral position allows the inclined surface 44f of the projection 44e of the parking cam 44 to push the button 45a of the rear light switch 45 with a result that the rear light (not shown) is on.

It should be further noted that the foregoing description shows only an exemplary embodiment. Various modifications and improvements are apparent to those skilled in the art without departing from the scope of the present invention which is only defined by the appended claims.

What is claimed is:

1. A parking brake mechanism for a motor vehicle transmission having a transmission output shaft and first and second transmission fork shafts which are movable parallelly with respect to said output shaft in response to the movement of a manually operated shift lever, said mechanism comprising:
   brake gear means coaxially mounted on said output shaft for rotation therewith;
   a brake pawl mounted for rotation about an axis parallel with said output shaft and carrying a tooth engageable with said brake gear means to lock the same, said brake pawl being formed at a side thereof opposite to another side thereof facing said brake gear means with a first cam portion;
   first biasing means for biasing said brake pawl to rotate in a direction to disengage said tooth from said brake gear means;
   a parking cam axially slidably carried by said first fork shaft said parking cam being integrally formed with a projection having an opening through which said second transmission fork shaft is slidably passed, and being additionally formed at a side thereof facing said first cam portion of said brake pawl with a second cam portion; and
   second biasing means for biasing said parking cam to move along the axis of said fork shafts in a direction in which said second cam portion engages said first cam portion for thereby urging said brake pawl to rotate in a direction to engage with said brake gear means against the force of said first biasing means.

2. A parking brake mechanism as claimed in claim 1, in which each of said first and second cam portions includes a first inclined section and a second inclined section the inclination angle of which, with respect to the axis of said fork shaft, is considerably smaller than that of said first inclined section, the engagement of said second inclined section of said parking cam with said second inclined section of said brake pawl inducing a locking engagement of said tooth of the brake pawl with said brake gear means.

3. A parking brake mechanism as claimed in claim 1, in which said brake gear means is a coupling sleeve formed around its periphery with a plurality of teeth forming a brake gear.

4. A parking brake mechanism claimed in claim 1, in which said parking cam is further formed with another projection which is engageable with a button of a vehicle rear light switch to cause ON-OFF operation of the same in response to the axial movement of said parking cam.

5. A parking brake mechanism as claimed in Claim 1, in which said second biasing means comprises a spring operatively disposed around said first transmission fork shaft between a spring seat fixed to said shaft and one end of said parking cam.

6. A parking brake mechanism as claimed in claim 5, further comprising a stop pin which is fixed to said first transmission fork shaft and is engageable with the other end of said parking cam to limit the movement of said parking cam in a direction in which the second cam portion engages with first cam portion.

7. A parking brake mechanism as claimed in claim 6, in which said parking cam is formed with a cut extending to its other end for receiving said stop pin.

8. A parking brake mechanism for a motor vehicle transmission having a transmission output shaft and a transmission fork shaft which is movable parallelly with respect to said output shaft in response to the movement of a manually operated shift lever, said mechanism comprising:

brake gear means coaxially mounted on said output shaft for rotation therewith;

a brake pawl mounted for rotation about an axis parallel with said output shaft and carrying a tooth engageable with said brake gear means to lock the same, said brake pawl being formed at a side thereof opposite to another side thereof facing said brake gear means with a first cam portion;

first biasing means for biasing said brake pawl to rotate in a direction to disengage said tooth from said brake gear means;

a parking cam axially slidably carried by said fork shaft, said parking cam being formed at a side thereof facing said first cam portion of said brake pawl with a second cam portion;

second biasing means for biasing said parking cam to move along the axis of said fork shaft in a direction in which said second cam portion engages said first cam portion for thereby urging said brake pawl to rotate in a direction to engage with said brake gear means against the force of said first biasing means, said second biasing means comprising a spring operatively disposed around said transmission fork shaft between a spring seat fixed to said shaft and one end of said parking cam; and a stop pin fixed to said fork shaft which is engageable with the other end of said parking cam to limit the movement of said parking cam in the direction in which the second cam portion engages said first cam portion, said parking cam being further formed with a cut extending towards its other end which receives said stop pin.

9. The parking brake mechanism of claim 8, wherein said vehicle further includes an additional transmission fork shaft which is moveable parallelly with respect to said transmission output shaft, and said parking cam further comprises a projection having an opening therethrough which slidably receives said additional transmission fork shaft.

10. The parking brake mechanism of claim 9, wherein said parking cam is further formed with another projection which is engageable with a button of a vehicle rear light switch to cause ON-OFF operation of the same in response to the axial movement of said parking cam.

* * * * *